United States Patent Office 3,105,073
Patented Sept. 24, 1963

3,105,073
N-BETA-(DICYCLOHEXYL-AMINO)-ETHYL-N-ALKYL-AMMONIUM HALIDES
Pietro Pratesi, Milan, Italy, assignor to Maggioni & C.S.p.A., Milan, Italy, a company of Italy
No Drawing. Filed July 30, 1959, Ser. No. 830,466
5 Claims. (Cl. 260—247.5)

This invention relates to new chemical compounds which have shown a remarkable neurotropic spasmolytic activity and a low toxicity. These compounds also possess an intensive protective activity against peptic ulcers.

The compounds embodying the invention are mono-quaternary ammonium salts as generally pictured on the following Table 1 which indicates their activity and toxicity. For toxicity it is intended herein the $LD_{50}$ in mice, for intraperitoneal administration of the medicament; the toxicity rating is expressed in milligrams per kg. b.w.

Activity is expressed in micrograms (0.001 milligram) per 100 mls. of tyrode: it is the dose capable of exerting a spasmolytic action on isolated ileum strips of guinea pigs, when these strips have been contracted by 5 micrograms per 100 mls. of tyrode of acetylcholine chloride.

TABLE 1

| Compound tested | Activity | Toxicity, mg./kg. |
|---|---|---|
| [dicyclohexylamino-ethyl-N-methylpiperidinium structure] | 5–10 | 120 |
| $-N\equiv(C_2H_5)_3$ | 5–6 | 140 |
| [N-methylpiperidinium structure with H] | 30–40 | 130 |
| [N-methylmorpholinium structure] | 70–80 | 110 |

TABLE 2

| Compound tested | Activity | Toxicity, mg./kg. |
|---|---|---|
| [diphenylamino-ethyl-N-methylpiperidinium structure] | 10 | 10 |
| $-N\equiv(CH_3)_3$ | 100–120 | 30 |
| $-N\equiv(C_2H_5)_3$ | 8–10 | 20 |
| [N-methylmorpholinium structure] | 100–120 | 65 |
| [N-methylpiperidinium structure with H] | 20–25 | 30 |
| $-N=(iso\ C_3H_7)_2$ with $CH_3$ | 5–10 | 30 |

The association of the high activity with low toxicity in the compounds of the invention depends upon the presence in their molecule of at least one hydrogenated nucleus, as it is demonstrated by the comparison with the corresponding aromatic derivatives reported on Table 2 above.

The substance N - beta-(dicyclohexylamino) - ethyl-methylpiperidinium chloride has been the subject of a particular investigation in order that its action upon peptic ulcers might be ascertained.

Experiments have been carried out on rats, by administering either orally or by hypodermic injections, in dosages from 15 to 30 milligrams per kilogram b.w. N-beta-(dicyclohexylamino)-ethyl-methyl-piperidinium chloride. The ulcers of the gastric walls of rats were obtained with the ligature of the pylorus, according to the technique of Shay, explained in the publication Shay, H. et al., Gastroenterology, vol. 5, page 43, 1945.

In the following Table 3 the results of tests made in comparison with atropine and other drugs, and controls (no treatment) are summarized: it is to be noted that the "ulceration degrees" are reckoned according to an empirical scale, in which grade 5 represents the ulceration of the gastric wall, and grades 1 to 4 represent one, two or more hemorrhagic spots or hemorrhagic areas or non-perforated ulcers.

TABLE 3

| Tested product and dosages | Treated animals | Ulceration, degree | Percentage of non-protected animals |
|---|---|---|---|
| Controls (no treatment) | 24 | 3.91 | 100 |
| Atropine hypod., 2 mg./kg | 11 | 2.55 | 91 |
| Atropine per os, 2 mg./kg | 6 | 2.33 | 66 |
| N-beta-(dicyclohexylamino)-ethyl-methylpiperidinium chloride, hypod.: | | | |
| 15 mg./kg | 10 | 1.56 | 40 |
| 30 mg./kg | 11 | 0.33 | 30 |
| Methantheline bromide, p. os: | | | |
| 15 mg./kg | 10 | 2.5 | 70 |
| 30 mg./kg | 10 | 3.37 | 100 |
| 60 mg./kg | 6 | 2.00 | 72 |
| Propantheline bromide, p. os: | | | |
| 15 mg./kg | 10 | 2.5 | 80 |
| 30 mg./kg | 10 | 1.9 | 80 |
| 60 mg./kg | 6 | 1.8 | 80 |

In these tests male rats of 150–200g. b.w. are kept fasting for 48 hrs. after which the pylorus is constricted by a ligature and the intensity of the lesions caused by the ligature is observed and classed according to the "ulceration degree" arbitrary rating referred to above.

The conclusions of these pharmacological tests are that the compounds of the invention are substances having a high anticholinergic power, an antisecretory activity on the gastric juice, and also a spasmolytic activity on the smooth musculature of the intestines of guinea pigs and rats under acetylchlorine contracture.

The compounds of the invention have also shown a regulatory action on the pH of the gastric juice, in that they act in the sense of diminishing the gastric hyperacidity caused either by acetylchlorine or hystamine.

The compounds of the invention can be obtained by one of the following methods:

(a) Quaternization of the corresponding tertiary base: this latter can be prepared by condensing a halogenated derivative of the general formula

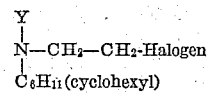

$$\begin{array}{c} Y \\ | \\ N-CH_2-CH_2\text{-Halogen} \\ | \\ C_6H_{11}\text{(cyclohexyl)} \end{array}$$

with a secondary aminic base such as dimethylamine, diethylamine, morpholine, piperidine, pyrrolidine and the like, in the presence of a basic condensing agent, such as magnesium oxide or sodamide;

(b) By directly condensing a halogenated derivative as described under (a) above, with a tertiary aminic base such as trimethylamine, triethylamine, N-methylpiperidine, N-methylmorpholine, N-methylpyrrolidine and the like.

The invention is illustrated but not limited by the following examples.

EXAMPLE 1

N-Beta-(Dicyclohexylamino)-Ethyl-N-Methyl-Piperidinium Bromide

For preparing the tertiary base, a flask is charged with 20.0 grams of beta-chloroethylpiperidine, 12.0 grams of dicyclohexylamine and 2.7 grams of magnesium oxide. The contents of the flask is heated to 160° C. for 24 hrs. on an oil-bath, with stirring. The reaction product is made strongly alkaline and is then extracted with ether. The etheral extract is dried up over potash. Ether is distilled off and the residue is subjected to fractional distillation and the fraction, which distills at 172° C.–174° C. under an absolute pressure of 0.6 millimeter of mercury, is collected. This is N-beta-(dicyclohexylamino)-ethyl-piperidine. Yield 28%.

For $C_{19}H_{36}N_2$.—Calcd. percent: C=78.01; H=12.41; N=9.58. Found percent: 78.00; 12.28; 9.20.

For preparing the bromide of N-beta-(dicyclohexylamino)-ethyl-methyl-piperidinium, 18.4 mls. of a 25% alcoholic solution of $CH_3Br$ are added to 14.27 grams of the tertiary base. Upon standing for 24 hrs. at −2° C. (minus two centigrades) a white precipitate is obtained which, crystallized from alcohol, exhibits an M.P. of 213° C.–214° C. Yield 14 grams.

For $C_{19}H_{36}N_2.CH_3Br$.—Calcd. percent: C=62.00; H=10.14. Found percent: 61.84; 9.97.

EXAMPLE 2

Beta-(Dicyclohexylamino)-Ethyl-Triethylammonium Bromide

For preparing the tertiary base, a flask is charged with 60.0 grams of dicyclohexylamine, 56.0 grams of beta-chloroethyldiethylamine and 6.6 grams of magnesium oxide. The mixture is heated on an oil-bath for 24 hrs. at 160° C. The reaction product is made strongly alkaline and extracted with ether. The etheral extract is dried up over KOH. The ether is distilled off and the residue is subjected to fractional distillation, during which a fraction which distills at 188°–189° C. under an absolute pressure of 20 millimeters of mercury is collected. This is N-beta-(dicyclohexylamino)-ethyl-diethylamine. Yield 25%.

For $C_{18}H_{25}N_2$.—Calcd. percent: C=77.08; H=12.94. Found percent: 76.70; 13.28.

To prepare the bromide of N-beta-dicyclohexylamino-ethyl-triethylammonium, 10 grams of the tertiary base are added to 2.6 mls. of ethyl bromide dissolved in 8 mls. of alcohol. Upon standing, a white crystalline precipitate is obtained which, recrystallized several times from alcohol, has a M.P. of 151° C. Yield 7 grams.

The bromide analyzes.—Calcd. percent: C=61.67; H=10.61. Found percent: 61.35; 10.79.

EXAMPLE 3

N-Beta-(Dicyclohexylamino)-Ethyl-N-Methylpyrrolidinum Bromide

For preparing the tertiary base, 60 grams of dicyclohexylamine are mixed with 54.76 grams of beta-chloroethyl-pyrrolidine and 6.6 grams of magnesium oxide. The mixture is heated on an oil-bath for 24 hrs. at 160° C. The reaction product is made strongly alkaline and is extracted with ether. The etheral extract is dried up over KOH, and ether is distilled off. The residue is subjected to fractional distillation and the fraction having a B.P. of 163° C.–164° C. under an absolute pressure of 0.6 millimeter of mercury is collected. This is N-beta-(dicyclohexylamino)-ethyl-pyrrolidine. Yield 26%.

For $C_{18}H_{34}H_2$.—Calcd. percent: C=77.62; H=12.30. Found percent: 77.31; 12.23.

To prepare the bromide of N-beta-dicyclohexylamino-ethyl-methyl-pyrrolidinum, 5.0 grams of the free base are added to 6.8 mls. of a 25% alcoholic solution of methyl bromide. Upon standing, a white crystalline precipitate is obtained which, repeatedly crystallized from alcohol has a M.P. of 214° C. Yield 4 grams.

For $C_{18}H_{34}H_2.CH_3Br$.—Calcd. percent: C=61.10; H=9.98. Found percent: 61.01; 10.23.

EXAMPLE 4

N-Beta-(Dicyclohexylamino)-Ethyl-N-Methylmorpholinium Bromide

For preparing the tertiary base, 60 grams of dicyclohexylamine are mixed with 62.0 grams of beta-chloroethyl-morpholine and 6.6 grams of magnesium oxide. The mixture is heated on an oil-bath for 24 hrs. at 160° C. The reaction product is made strongly alkaline and is extracted with ether. The etheral extract is dried up over KOH. The ether is distilled off and the residue is rectified, collecting the fraction passing at 190° C–191° C. under an absolute pressure of 1.5 millimeters of mercury. This is N-beta-(dicyclohexylamino)-ethyl-morpholine. Yield 32%.

For $C_{18}H_{34}.CH_3Br$.—Calcd. percent: C=73.36; H=11.63. Found percent: 73.02; 11.62.

To prepare the bromide of N-beta-dicyclohexylamino-ethyl-methyl-morpholinium, 5 grams of the tertiary base are added to 6.6 mls. of 25% alcoholic solution of $CH_3Br$. Upon standing a white crystalline precipitate is obtained which, after repeated crystallizations from alcohol, shows a melting point of 187° C. Yield 4.5 grams.

For $C_{18}H_{34}N_2O.CH_3Br$.—Calcd. percent: C=58.60; H=9.57. Found percent: 58.35; 9.74.

An alternative method for preparing N-beta-dicyclohexylaminoethyl - piperidinium - and - morpholinium-N-alkyl-halides is suggested in the following Examples 10 and 11.

EXAMPLE 5

N-Beta-(Dicyclohexylamino)-Ethyl-N-Alkyl-Piperidinium Halides

An example of this alternative method is the condensation of beta-chloroethyldicyclohexylamine with N-methyl-piperidine. One mole of beta-chloroethyl-dicyclohexylamine and one mole of N-methylpiperidine are dissolved in 4 mls. of alcohol and refluxed for 2 hrs. On cooling and after addition of ether, white crystals are obtained having a M.P. of 225° C. Yield 60%.

The compound N-beta-dicyclohexylamino-ethylpiperidinium analyzes:

For $C_{19}H_{36}N_2.CH_3Cl$.—Calcd. percent: C=70.04; H=11.46. Found percent: 69.84; 11.70.

EXAMPLE 6

Preparation of N-Beta-(Dicyclohexylamino)-Ethyl-N-Methyl-Morpholinium Chloride One mole of beta-chloroethyl-dicyclohexylamine and one mole of N-methyl-morpholine are dissolved in 30 mls. of ethyl alcohol and the mixture is refluxed for 2 hrs. On cooling and addition of ether, slightly hydroscopic white crystals (M.P. 228° C.) are obtained. Yield 63%.

For $C_{18}H_{34}N_2O.CH_3Cl$.—Calcd. percent: C=66.16; H=10.81. Found percent: 65.85; 11.15.

What I claim is:

1. N - beta - (dicyclohexyl - amino) - ethyl - N-methyl-piperidinium bromide.

2. Beta - (dicyclohexyl - amino) - ethyl - triethyl-ammonium bromide.

3. N - beta - (dicyclohexyl - amino) - ethyl - N-methyl-pyrrolidinium bromide.

4. N - beta - (dicyclohexyl - amino) - ethyl - N-methyl-morpholinium bromide.

5. N - beta - (dicyclohexyl - amino) - ethyl - N-methyl-morpholinium chloride.

References Cited in the file of this patent

UNITED STATES PATENTS 2,687,414   Cusic _____ Aug. 24, 1954